United States Patent [19]

Lotz

[11] 4,083,277
[45] Apr. 11, 1978

[54] METHOD AND MEANS FOR RE-SPACING CHIP STEAKS ON A CONVEYOR

[76] Inventor: Walter Edward Lotz, 74 Laureleaf Road, Thornhill, Ontario, Canada, L3T 2Y1

[21] Appl. No.: 697,970

[22] Filed: Jun. 21, 1976

[51] Int. Cl.² .............................................. B26D 4/46
[52] U.S. Cl. .......................................... 83/89; 83/91; 83/106; 83/107; 83/110; 83/155; 214/6 R; 271/173
[58] Field of Search .................... 83/26, 27, 89, 90, 91, 83/92, 102, 106, 107, 110, 112, 155, 155.1; 271/173, 172, 64; 198/435, 436, 442; 214/1 S, 1 N, 6 R

[56] References Cited
U.S. PATENT DOCUMENTS

| | | | |
|---|---|---|---|
| 2,379,682 | 7/1945 | Colucci et al. | 83/110 X |
| 2,427,223 | 9/1947 | Moore | 83/89 X |
| 2,540,972 | 2/1951 | Wagner et al. | 271/64 X |
| 3,101,475 | 8/1963 | Peterson et al. | 198/435 X |
| 3,179,234 | 4/1965 | Bloom et al. | 83/102 X |
| 3,190,518 | 6/1965 | Insolio | 225/96.5 |
| 3,846,958 | 12/1974 | Divan | 83/89 X |

Primary Examiner—J. M. Meister

[57] ABSTRACT

According to the invention chip steaks initially deposited on a conveyor in close consecutive order are re-spaced to assume an extended order en route to facilities for stacking the chip steaks in erect piles; the re-spacing being accomplished by accelerating at least one section of the conveyor and as well, by diverting the stream of chip steaks conveyed as aforesaid into two branch streams, at least, respectively directed to separate and separated stackers.

5 Claims, 3 Drawing Figures

U.S. Patent
April 11, 1978
4,083,277
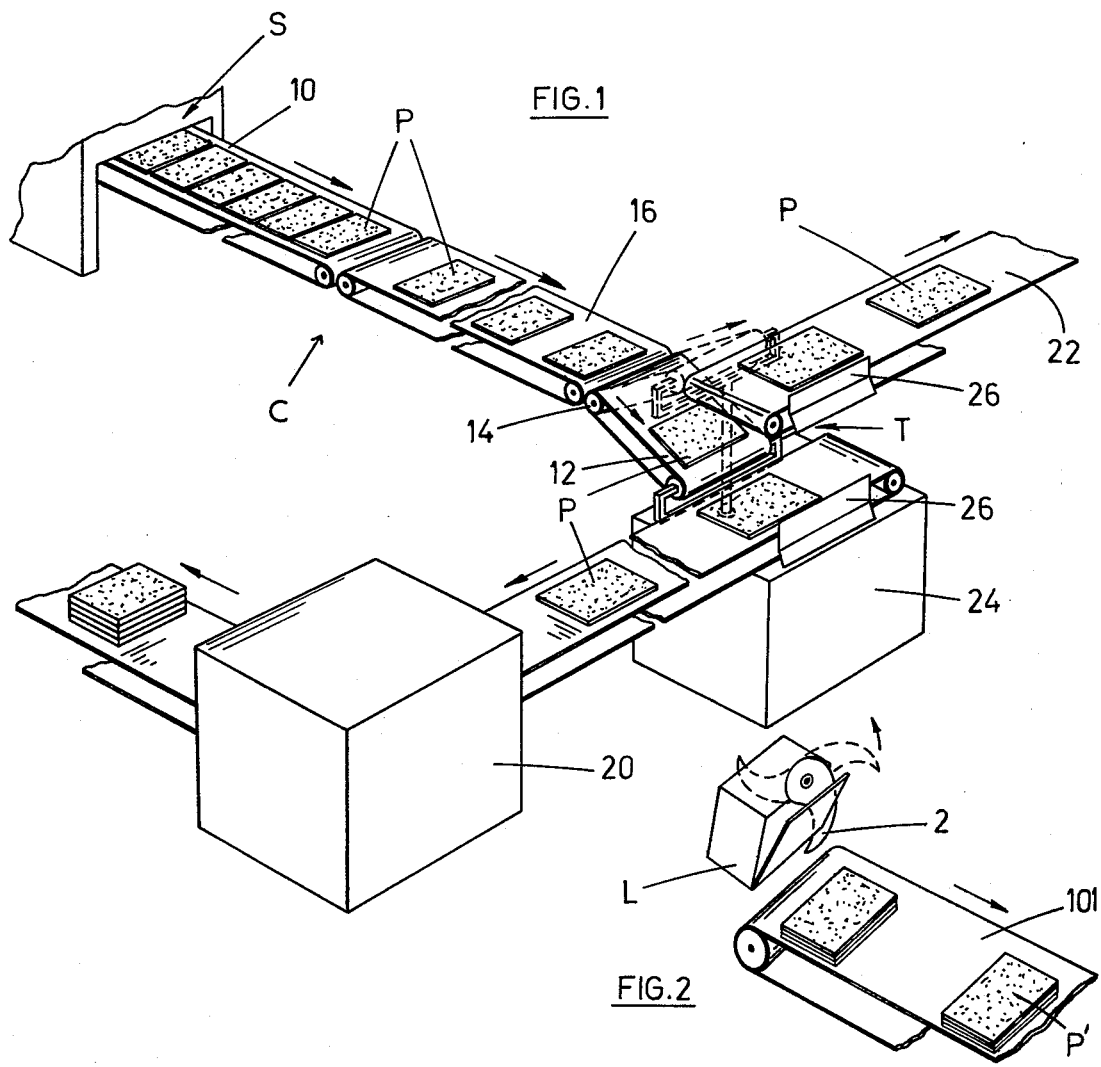
FIG. 1
FIG. 2
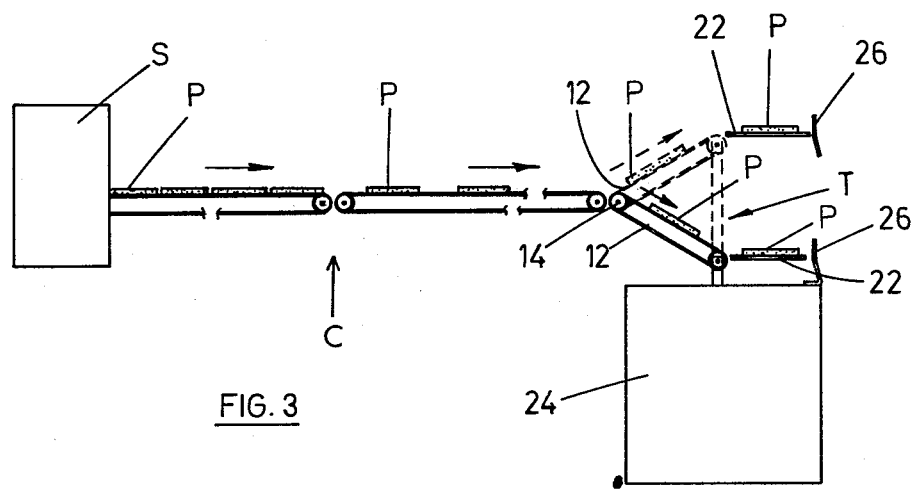
FIG. 3

METHOD AND MEANS FOR RE-SPACING CHIP STEAKS ON A CONVEYOR

The invention relates generally to method and means for conveying small, flat, articles from a source of supply to facilities for processing these articles.

A type of article particularly contemplated by the invention is the chip steak — so called — sliced from a prepared meat loaf comprised, usually, of pieces of meat pressed into the form of a loaf measuring, for example, 30 inches in length more or less and 4 by 7 inches in cross sectional dimension. Said loaf is usually frozen and tempered not only for hygienic reasons, but also to facilitate subsequent handling — e.g. slicing.

Facilities for processing these chip steaks as contemplated by the invention may comprise, for example, apparatus for stacking the slices or chip steaks whereby to re-assemble them more or less in loaf form which further facilitates later treatment, e.g. packaging, cooking and so forth.

The particular problems which the invention seeks to overcome originate in the icy, slippery and friable condition of the slices and in the desirability of re-assembling them expeditiously and automatically in substantial registration with each other.

Expediently, the meat loaf is sliced by an automatic slicer of more or less conventional character which is capable of delivering a prolific stream of chip steaks in rapid succession. However, because of the necessity for circumspect handling, owing to their slipperiness and friability, the chip steaks can be taken away from the slicer only at relatively low speeds. Thus, the chip steaks are delivered by the slicer to the take-away conveying means in fairly close consecutive order. Conversely, the processing or stacking facilities specifically contemplated by the invention require the chip steaks to be delivered to them at spaced intervals or in extended order as distinguished from the close consecutive order in which they start out from the supply source.

Within the purview of the invention, the re-spacing of the chip steaks may be rendered more efficient and be facilitated by dividing the main chip steak stream into divergent branch streams for respective processing by separate and separated sub-divisions of the processing facilities.

The conveying means which takes delivery of the chip steaks from the slicer transports them to a transfer point at which they are divided into the two branch streams.

Intermediate the slicer and the transfer point, the conveyor is provided with an accelerator section which, by increasing the speed of conveyance of the chip steaks, tends to space them further apart. At the transfer point, the conveyor has a third section or shuttle which is operable to divide the chip steaks into the two branch streams for respective delivery to two relatively independent sub-divisions of the processing facilities which procedure has the effect of re-spacing them still further.

The objects of the invention are; to provide method and means with improved capability compared to the prior art for taking delivery of a main stream of small friable, fragile chip steaks in close consecutive order from a source of chip steak production; for conveying the said chip steaks from said source to a transfer station; for widening the separation of said chip steaks while being so conveyed and for transferring said widely separated chip steaks to the processing facilities at said transfer station.

It may be worthy of note at this point that the number of sub-divisions actually comprehended in said processing facilities is dependent on two factors, namely (a) the rate at which chip steaks are provided by the source, and (b) the rate at which they can be handled by the functional part of the processing facilities.

Said functional part as visualized by the invention is the specific stacking apparatus which piles the chip steaks into successive vertical stacks; each chip steak being individually handled in the process; the spacing between them being necessitated in order to permit complete disposition of each chip steak before the next arrives.

Thus, according to the invention, means are provided for re-spacing chip steaks in continual transit from a source thereof to processing facilities remote from said source; said means comprising a conveyor having a plurality of operating sections for transporting the chip steaks from said source to a transfer station for transfer to said processing facilities.

One section of the conveyor is an input stage which is disposable to receive said chip steaks from said source. As the chip steaks must be handled circumspectly for reasons stated above, the transport speed of the input stage is held to a minimal rate sufficient only to permit chip steaks to be deposited thereon in closely spaced consecutive order. The chip steaks are thereafter transported from said source towards a transfer station.

The conveyor may include an accelerator section communicating with said input stage to receive chip steaks therefrom and to accelerate them thereby introducing significant spacing between them.

Chip steaks carried by said conveyor are transported to its output stage, a shuttle, which reaches to said transfer station.

At least two, relatively independent, sub-divisions of said processing facilities converge on said transfer station within reach of said shuttle which communicates with a carrier forming part of each respective sub-division to transfer chip steaks thereto; said carrier taking delivery of the chip steaks and conveying them to the processing locations of said processing facilities; the spacing between chip steaks conveyed to said processing location having been further increased by the co-action of said shuttle with said carriers.

Assuming, for the purposes of illustration and not in limitation of the invention, the use of two separate and separated sub-divisions, as aforesaid, the shuttle is operated by mechanism which communicates the conveyor alternately with each sub-division; transferring alternate chip steaks to each for the purpose of dividing the stream of chip steaks between the two sub-divisions and incidentally increasing the separation between consecutive chip steaks.

One embodiment of the present invention will now be described by way of example, with reference to the accompanying drawings of which:

FIG. 1 is a largely diagrammatic perspective view of one embodiment of the apparatus of the invention;

FIG. 2 is a diagrammatic view of a detail of the invention;

FIG. 3 is a diagrammatic side view of the apparatus of FIG. 1.

It will be recalled that the invention is concerned not only with the method but also means or apparatus for re-spacing chip steaks in continual transit from a source to processing facilities usually located somewhat remote from said source. Accordingly, the apparatus of the invention will be described with interspersed comments on the method or process for practising the invention.

It will be appreciated that the term "chip steaks" as herein used, refers generally to small articles such as slices cut from prepared meat loaf or the like which may have a circular, oval, rectangular or even irregular contour according to the shape of the meat loaf.

In the normal course of events, the meat loaf is kept under refrigeration, for obvious reasons, and may become icy in the result; the slices cut therefrom also tending to be icy.

It is also deemed worthy of repetition herein that the problems which the invention seeks to resolve arise in connection with the disposition of the chip steaks after they are sliced from the meat loaf. In particular, the invention contemplates that the individual chip steaks have ultimately to be stacked in piles or assemblies of any convenient number from which the individual components are thereafter readily removable, for cooking, for example.

The stacking is accomplished by so-called stackers which form part of the processing facilities to which reference was made previously. As already explained, the specific problems arising in the transfer of the chip steaks from the source to the processing facilities are somewhat complex. That is to say, there is the problem engendered by the fact that the chip steaks are friable, and hence prone to disintegration under vigorous handling; the expedient for meeting this problem resulting in initial close consecutive spacing of the chip steaks on the conveyor.

The close spacing of the chip steaks in turn gives rise to further problems, emanating from the fact that the processing facilities (or the stacker forming part thereof) best handle chip steaks on an individual basis.

For this reason chip steaks conveyed to the facilities must be re-spaced to assume an extended order (instead of the close consecutive order in which they are initially deposited on the conveyor) whereby to provide a brief interval between successive chip steaks reaching the stacker, and thus permit their individual accomodation by the stacker.

Adverting now to the drawing it will be seen that, in FIG. 1, the reference device S denotes the source which provides chip steaks P which may be sliced in a well known manner from meat loaf L by a conventional rotary cutter 2 shown in FIG. 2 which incidentally, forms no part of this invention.

As further indicated in FIG. 2, as soon as chip steaks are cut from loaf L, they drop immediately or are otherwise deposited onto conveyor C by which they are conveyed from source S to a transfer station T at the remote end of conveyor C and at which point they are thereafter transferred to the processing facilities to be described.

The desired re-spacing of the chip steaks P is efficiently accomplished in two diverse ways according to the invention.

Firstly conveyor C is formed of a plurality of independently operable stages or sections; three being shown in this embodiment. The first of these is the input stage 10 which takes delivery of chip steaks P from source S; input stage 10 being operated relatively slowly not only to avoid harming the chip steaks P but also for better control thereof in view of their slippery condition. Resultantly, chip steaks P land on input stage 10 in closely spaced consecutive order in which they are initially moved towards transfer station T.

The output stage of conveyor C, at its end remote from input stage 10, is in the form of a ramp hinged to a preceding conveyor section. Said ramp, which is hereinafter referred to as shuttle 12, reaches to transfer station T and is movable on its hinge 14 between the two positions, at least, to be described.

Between the input stage 10 and shuttle 12, there is at least one intermediate section hereinafter referred to as the accelerator section 16 which communicates herein between input stage 10 and shuttle 12 and travels at a faster linear rate than the input stage 10. The three enumerated conveyor sections are, of course, aligned and interrelated to permit continuous transfer of chip steaks P successively from the input stage 10 to accelerator section 16 and then to shuttle 12.

As chip steaks P reach and are taken on by accelerator section 16 from input stage 10, they obviously accelerate accordingly and become, resultantly, more widely spaced thereon, in comparison to their spacing on input stage 10.

The shuttle 12 which receives chip steaks P from accelerator section 16 should operate to advance chip steaks P at a rate at least commensurate with that of its predecessor section. Thus, chip steaks P arrive at transfer station T in their first extended order at least.

A further expedient for re-spacing chip steaks P according to the invention involves the use of processing facilities which are sub-divided to provide at least two stackers 20 (for clarity only one is shown in the drawings) and other equipment including carriers 22—22 respectively associated therewith. That is to say, there are at least two sub-divisions of the processing facilities; each being provided with a carrier 22 for delivery of chip steaks P from transfer station T to an associated stacker 20. For obvious reasons, these sub-divisions are not only separate but also separated except that their respective carriers 22—22 converge towards the transfer station T; preferably from opposite sides of the conveyor C as shown, for example in the drawings.

In the present embodiment of the invention the carriers 22—22 are disposed one above the other at transfer station T and shuttle 12 is therefore operated to swing upwardly and downwardly as indicated in FIG. 1 by the curved arrow for alternate communication with each carrier 22 so that the main stream of chip steaks P originating at source S is finally divided into two branch streams; alternate chip steaks P being fed from the main stream to each branch stream.

It will be appreciated that chip steaks P generally leave shuttle 12 under substantial momentum.

To ensure that they do not skid off carriers 22—22 because of their momentum and slippery condition the invention provides a fence 26 suitably mounted beside each carrier 22, as illustrated in the drawings, which not only arrests their motion across the carrier 22 but also aligns them to a degree so that successive chip steaks are more or less aligned with each other on carrier 22 as they proceed to processing position of corresponding stacker 20.

In FIG. 1, the position of shuttle 12 communicating with lower carrier 22 to convey chip steaks P thereto is shown in solid lines, while the position of shuttle 12 in communication with upper carrier 22 to convey chip steaks P thereto is shown in broken lines.

It need scarcely be observed that any of several known switching devices and mechanisms may be utilized for procuring oscillation of the shuttle 12 on its hinge 14 in timed relation to the advance of chip steaks P on conveyor C in order to ensure that alternate chip steaks P will ultimately land on the respective carriers 22—22; said switching and alternating mechanism being herein identified by reference numeral 24.

It should be observed that the present embodiment of the invention contemplates the deposit of individual chip steaks P on input stage 10 of the conveyor. In practice of course, it is not unusal to deposit said chip steaks P on input stage 10 in groups of three (more or less) which are thereafter respectively treated as individual units.

Not only does the invention remain completely operative with the grouping of chip steaks as aforesaid but, in fact, its advantages and benefits become even more obvious under these conditions.

Section 101 may be added to conveyor C to receive chip steaks P from the rotary cutter 2 and to deliver them to input section 10 (not shown in this view) which it precedes.

The foregoing description has also omitted mention of the practice of interleaving chip steaks or groups of chip steaks with separation sheets which, of course, serve the purpose of preventing the stacked chip steaks from freezing together. It will be appreciated, however, that the invention does not depend on interleaving and interleaving does not form a part thereof.

Various modifications to the described embodiment within the scope of the invention will be apparent to those skilled in the art, the scope of the invention being defined in the appended claims.

What I claim is:

1. Means for conveying chip steaks in a friable, slippery, state in continual transit from a stationary source to processing facilities remote from said source, comprising
   a conveyor for transporting chip steaks from said source to a transfer station for transfer to said processing facilities, said conveyor incorporating a plurality of operating sections;
   an input stage constituting one of said sections disposable to receive chip steaks from said source in relatively closely spaced consecutive order and to transport them from said source towards said transfer station;
   a shuttle constituting another of said conveyor sections reaching to said transfer station and travelling faster than the input stage;
   an accelerator section between the input stage and the shuttle;
   at least two, relatively independent subdivisions of said processing facilities converging on said transfer station within reach of said shuttle;
   mechanism for operating said shuttle to communicate said conveyor alternately with each said subdivision and to transfer alternate chip steaks thereto, and
   a carrier forming part of each said subdivision onto which the chip steaks are transferred by said shuttle; the speed of said carrier being timed in relation to the said processing facilities;
   the input stage, accelerator section and shuttle being serially disposed enabling chip steaks to be transferred in succession from the input stage to the accelerator section and from there to the shuttle;
   said source including a cutter for slicing successive chip steaks from a meat loaf for sequential deposit on the input stage;
   the input stage being operable in timed relation to the cutter to receive the successive chip steaks in relatively closely spaced order and to impart a slow initial momentum thereto towards said transfer station;
   said accelerator section being operable at a faster rate than the input stage increasing the momentum of the chip steaks and introducing significant spacing therebetween, and
   the shuttle being operable to advance chip steaks at a rate commensurate with that of the accelerator section.

2. Means for re-spacing chip steaks as set forth in claim 1 wherein the carriers of said sub-divisions are disposed at different levels and the shuttle is hinged to a preceding conveyor section for swinging upwardly and downwardly thereon between the sub-division carriers.

3. Means for re-spacing chip steaks as set forth in claim 2 wherein the carriers of said sub-divisions are respectively disposed on opposite sides of said conveyor, and overlap each other at the said transfer station.

4. Means for re-spacing chip steaks as set forth in claim 1 being disposed one above the other at the transfer station and the shuttle being hinged to a preceding conveyor section for swinging thereon between the sub-division carriers, and said sub-divisions include alignment means for aligning chip steaks on said sub-division carriers.

5. Means for re-spacing chip steaks as set forth in claim 4 wherein the carriers of said sub-divisions are respectively disposed on opposite sides of said conveyor.

* * * * *